United States Patent [19]
Opdyke

[11] Patent Number: 5,692,613
[45] Date of Patent: Dec. 2, 1997

[54] PICTURE FRAME STORAGE BOX FOR CDS, VIDEOS, TRADING CARDS AND THE LIKE

[76] Inventor: Stanford E. Opdyke, 3806 N. Gove, Tacoma, Wash. 98407-4905

[21] Appl. No.: 713,012

[22] Filed: Sep. 12, 1996

[51] Int. Cl.$^6$ ................................................. B65D 85/30
[52] U.S. Cl. .......................... 206/425; 206/455; 206/561; 40/313; 40/725; 40/781; 220/356; 220/524
[58] Field of Search ........................ 206/425, 308.1, 206/449, 459.5, 561, 455; 40/312, 313, 720, 725, 721, 722, 781; 220/352, 356, 345, 524

[56] References Cited

U.S. PATENT DOCUMENTS

| | | | |
|---|---|---|---|
| 619,826 | 2/1899 | Hawes | 40/313 |
| 823,339 | 6/1906 | Leigh et al. | 40/313 |
| 876,514 | 1/1908 | Ball | 40/313 |
| 3,716,936 | 2/1973 | Miller | 40/720 |
| 4,901,456 | 2/1990 | Cotutsca | 40/720 |
| 4,998,361 | 3/1991 | Gordon | 40/721 |
| 5,004,106 | 4/1991 | Blumstock et al. | 220/524 |
| 5,213,254 | 5/1993 | Regis et al. | 206/425 |
| 5,253,756 | 10/1993 | Goekler | 206/561 |
| 5,363,964 | 11/1994 | Hexter, Jr. | 206/449 |

*Primary Examiner*—Paul T. Sewell
*Assistant Examiner*—Luan K. Bui
*Attorney, Agent, or Firm*—Kathleen T. Petrich

[57] ABSTRACT

A picture frame storage box (10, 10A) having a body (12) with a front (16) and two oppositely situated endwalls (20, 22) that connect the front (16) to the back (18). The front and back each have top edges (28). Each endwall (20, 22) is of a size and shape to extend above the front and back top edges (28), creating an abutment (32). Each abutment (32) has an exposed surface (34) that faces the other. A base (24) adjoins the front (16) the back (18), and two endwalls (20, 22) to form a storage compartment (26) of a size and shape to hold CD's, videos, trading cards, and the like. One or more dividers (44) may connect front (16) to back (18) and is laterally spaced between endwalls (20, 22). Each divider (44) divides storage compartment (26) into separate compartments. Each divider (44) includes a top (46) that is of a size and shape to extend above the front and back top edges (28), creating an abutment having two oppositely situated exposed surfaces (48, 50). Each dividers exposed surface faces the nearest endwall exposed surface (34). Each compartment (26) includes one picture displaying lid (14, 14A) of a size to fit over its corresponding compartment by resting atop the front and back top edges (28) and is abutted by two facing exposed surfaces (34, 48, 50).

10 Claims, 2 Drawing Sheets

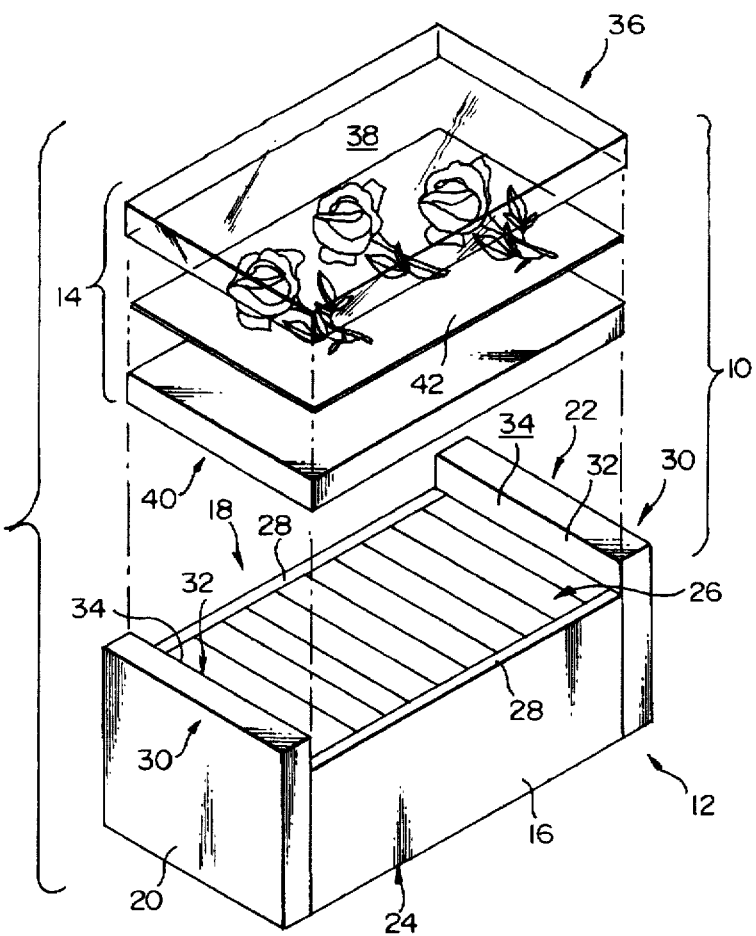
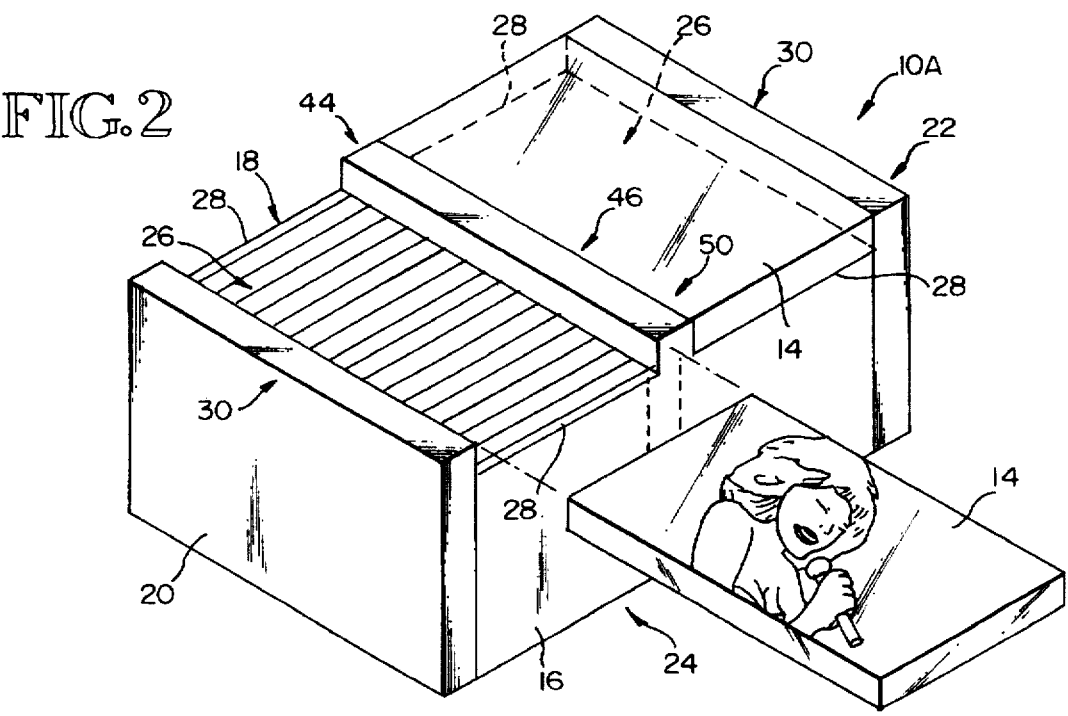

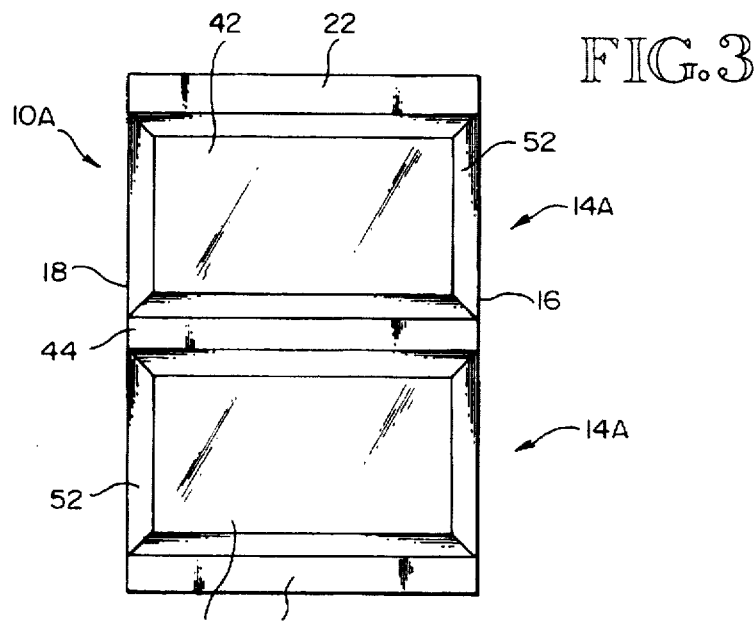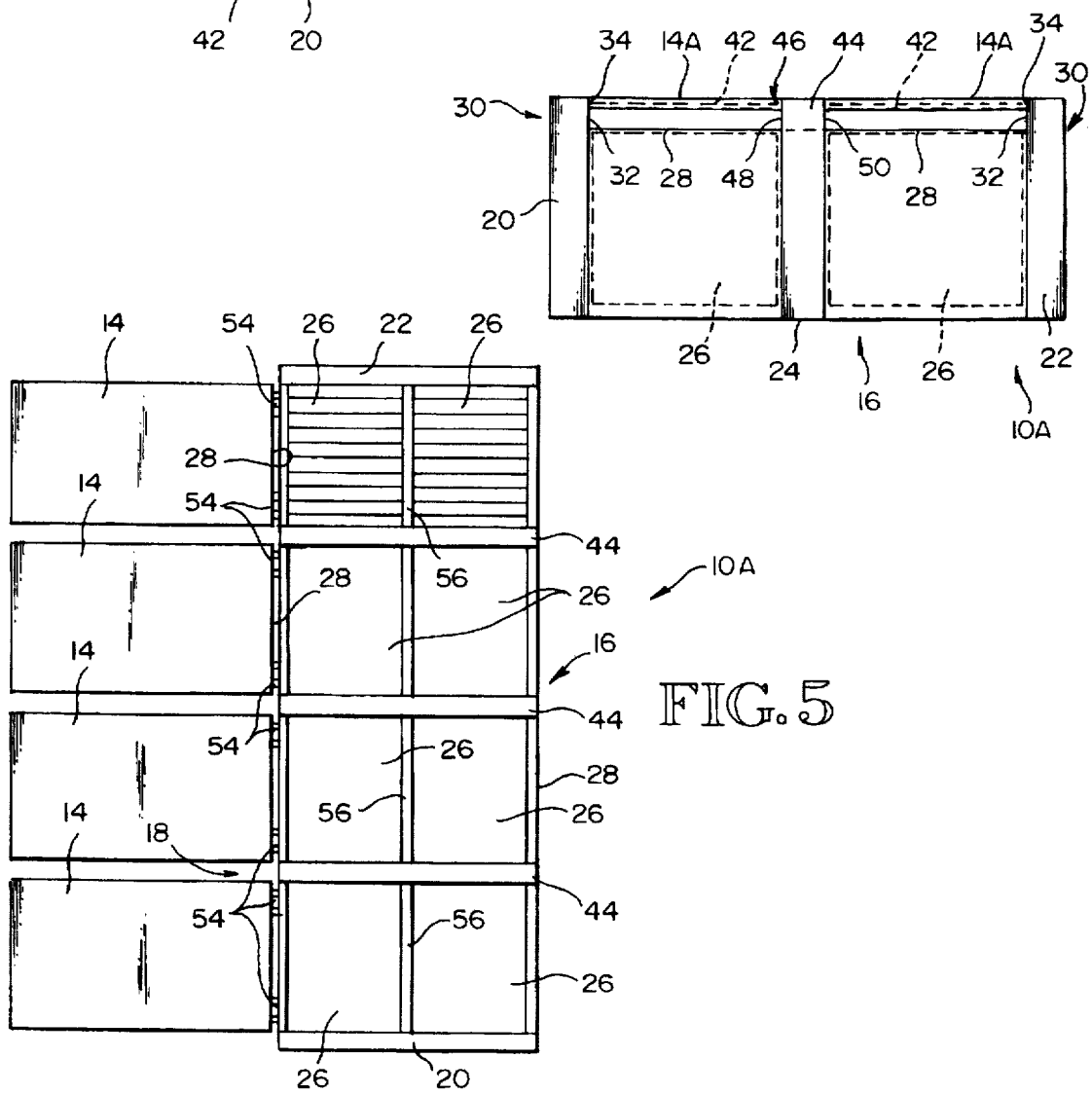

PICTURE FRAME STORAGE BOX FOR CDS, VIDEOS, TRADING CARDS AND THE LIKE

TECHNICAL FIELD

The present invention relates to picture frame displaying storage boxes for holding/storing CDs, videos, trading cards and the like.

BACKGROUND OF THE INVENTION

We are a society of collectors. We collect everything from postage stamps to photographs to trading cards. With the advent of improved entertainment systems, individual homeowners are also collecting compact discs (CDs) and video cassettes (videos) on a regular basis. Thus, storage of these items becomes a major issue.

With so many collected items to store, space in one's abode becomes very important. It is desirous to be able to have storage containers that are not only aesthetically pleasing, but also capable saving space by displaying a picture, photograph, artwork, or other indicia.

DISCLOSURE OF THE INVENTION

The present invention is a picture frame storage box having a body with a front, a back, and a pair of oppositely situated end walls. The oppositely situated end walls connect the front to the back. The front and the back each have a top edge. Each end wall is of a size and shape to extend above the front and back top edges, thereby creating an abutment with an exposed surface on each end wall situated above the front and back top edges. Each exposed surface faces the other. The body also includes a base that is adjoined to the front, the back, and two end walls. Thus, a storage compartment is formed that is defined by the base, front, back, and two end walls.

The box also includes a lid that operably displays a picture. The lid is of a size and shape to fit over the compartment by resting atop the front and back top edges and is abutted by the two exposed surfaces.

According to one aspect of the invention, the picture frame storage box also includes at least one divider connecting the front to the back and is laterally spaced between the two end walls. Each divider includes a top portion that is of a size and shape to extend above the front and back top edges, creating an abutment having two oppositely situated exposed surfaces. Each divider exposed surface faces the exposed surface of the nearest end wall.

A plurality of storage compartments is created wherein the compartments are defined by the base, the front, the back, the two end walls, and the at least one divider. The alternate picture frame storage box also includes one lid for each compartment, wherein each lid operably displays a picture. Each lid is of a size and shape to fit over a compartment by resting atop the front and back top edges and is abutted by two facing exposed surfaces.

According to one aspect of the invention, each lid is affixed to the body. Preferably, the lid is hinged to the body at the back top edge.

In preferred form, each lid is a transparent picture frame box having a transparent surface and an interior box of a size and shape to securely position the picture against the transparent surface. The transparent surface may be 11"×14", 8"×10", 5"×7", 4"×6", or 3"×5". An alternate embodiment of the lid includes a molding to border the picture.

The box may also include a subdivider spanning between one end wall and its nearest divider to form a subdivided storage compartment. The subdivided storage compartment is sized to receive a plurality of trading cards, whereas the divided compartments are sized to receive a plurality of compact discs, and the non-divided compartments are sized to receive a plurality of video cassettes.

These and other advantages, objects, and features will become apparent from the following best mode description, the accompanying drawing, and the claims, which are all incorporated herein as part of the disclosure of the invention.

BRIEF DESCRIPTION OF THE DRAWING

Like reference numerals are used to designate like parts throughout the several views of the drawing, wherein:

FIG. 1 is a pictorial view of the picture frame storage box body defining a storage compartment and with an exploded view of the picture frame lid shown removed;

FIG. 2 is a pictorial view of a second embodiment of the invention, except showing a divider forming two storage compartments and with one picture frame lid for each compartment;

FIG. 3 is a plan view of FIG. 2, except with an alternate embodiment of the picture frame lids;

FIG. 4 is a front view of FIG. 3; and

FIG. 5 is a third embodiment of the invention showing each picture frame lid affixed to the box body and showing at least one subdivider, subdividing a storage compartment.

BEST MODE FOR CARRYING OUT THE INVENTION

Referring to FIG. 1, the present invention is a picture frame storage box 10 that has a body 12 and a picture frame lid 14. The body is designed to hold store compact discs ("CDs"), video cassettes ("videos") trading cards, such as baseball cards, and the like. Body 12 has a front 16, a back 18, and two oppositely situated end walls 20, 22 that connect the front 16 to the back 18. The body also includes a base 24 that is adjoined to the front 16, back 18, and two end walls 20, 22. A storage compartment 26 is formed from base 24, front 16, back 18 and two end walls 20, 22. Compartment 26 holds and supports CDS, videos and the like, independent of what the body is resting on.

The front 16 and the back 18 each have a top edge 28 that supports the picture frame lid 14 when placed atop of body 12. In addition, each end wall 20, 22 also includes a top portion 30 that is positioned above the front and back top edges 28. The resulting upwardly extending protrusion of each end wall extends above the front and back top edges 28 creating an abutment (32). Each abutment (32) includes an exposed surface 34 that faces the other.

The picture frame lid 14 operably displays pictures, such as photographs, artwork, or other indicia. The first embodiment of picture frame lid 14, as disclosed in FIG. 1, is a transparent box 36 sized and shaped to fit snugly between exposed surfaces 34 when lid 14 is placed over compartment 26, resting atop front and back top edges 28. Exposed surfaces 34 act as an abutment to transparent box 36.

Transparent box 36 includes a top transparent surface 38 and another snugly fitting interior box 40 positioned within transparent box 36. At least one picture 42 (artwork or other indicia) is placed atop interior box 40 in order to be clearly displayed through top surface 38. In this manner, when lid 14 is placed atop compartment 26, of body 12, a picture of the owner's choosing adorns the box. The picture can easily be changed to suit the owner's interest.

The transparent lid may be used to provide indicia of the contents of the box, as shown in FIG. 2. For example, if the subject matter was children's videos, an appropriate label or picture indicating the same would be displayed through the transparent surface. Also, if the owner wants a clear protector over the storage compartment, but still wishes to see through the lid to view the contents, the picture 42 and interior box 40 may be omitted.

In use, the box may rest on its base, front, back, or either end wall to accommodate various pictures and space constraints.

In preferred form, the body is made from wood, but it may also be made from man-made materials, such as plastic, and/or heavy-duty cardboard. Front and back top edges are preferable at least ⅛" thick. Each lid is preferably a standard sized clear plastic picture frame that is commonly found in art supply stores and general merchandise stores. The benefit of using a standard sized transparent picture frame box, is that it keeps manufacturing costs down and can easily be replaced if broken. Although the box and lid may be constructed of any size, it is preferred that the box be constructed to accommodate a standard sized picture frame such as a 3"×5", 4"×6", 5"×7", 8"×10" and 11"×14". The size of the picture frame lid will be dictated by the type goods that are to be stored, such as CDS is best used with a 5"×7" picture frame, while videos work better with an 8"×10" picture frame. They will also depend on the amount of dividers that are placed into the body of the box, discussed below.

The second embodiment of the invention is shown in FIG. 2 at "10A." In this embodiment, there is at least one divider 44 that connects front 16 to back 18 and is laterally spaced between end walls 20, 22. Divider 44 may also be fixedly attached to base 24. Divider 44 includes a top portion 46 that is sized and shaped similar to top portion 30 of end walls 20, 22. Top portion 46 creates an abutment having two oppositely situated exposed surfaces 48, 50 that are defined by the top portion 46 that is above front and back top edges 28. Each exposed surface 48, 50 faces its respective end wall 20 or 22. With the addition of each divider, more storage compartments 26 are formed. Thus, as shown in FIG. 2, there are two storage compartments that are each bordered by an end wall and the divider and the front, and the back. With each compartment, there is a separate picture frame lid 14 that rests atop the front and back top edges 28 of each compartment and is abutted by facing exposed surfaces of the divider or end wall above compartment.

A second embodiment of the picture frame lid may be like that of a traditional picture frame shown at "14A" having a molding 52 used to border picture 42, as shown in FIGS. 3 and 4. Lid 14A has a display area to display a picture 42.

Although in its most simplistic form, picture frame lid 14 rests atop front and back top edge portions or complete edge and abutted by the exposed surfaces above each compartment, picture frame lid 14 or 14A may also be affixed to the body in FIG. 5. FIG. 5 shows lids 14 hinged at hinge 54 to the top edge 28 of the back. If desired, a hasp closure mechanism (not shown) may be used to affix the lid to the front top edge. A lock (not shown) may be used to lock the lid to the body if desired.

Referring to FIG. 5, subdividers 56 may be used to further divide any compartment to accommodate smaller items, such as trading cards.

The illustrated embodiments are only examples of the present invention and, therefore, are non-limitive. It to be understood than many changes in the particular structure, materials and features of the invention may be made without departing from the spirit and scope of the invention.

Therefore, it is my intention that my patent rights not be limited by the particular embodiments illustrated and described herein, but rather determined by the following claims, interpreted according to accepted doctrines of claim interpretation, including the doctrine of equivalents and reversal of parts.

What is claimed is:

1. A picture frame storage box comprising:

a box body having a front wall, a back wall, a pair of oppositely situated end walls that connect the front wall to the back wall, said front wall and said back wall each having a top edge, each said end wall is of a size and shape to extend above the top edges of the front and back walls, creating abutments, each with an inner surface on its respective end wall situated above the top edges of the front and back walls, wherein each said inner surface faces the other, said box body also including a base that adjoins the front wall, back wall, and two end walls, thus forming a storage compartment that is defined above the base, and by and between the front wall, back wall, and two end walls; and a lift-off lid of a size and shape to fit over the storage compartment by resting atop the front wall and back wall top edges and is abutted by the two inner surfaces, said lid having an opaque inner wall, a transparent outer wall, two side edges, and front and back edges, with a picture receiving space being formed by and between the inner and outer walls, wherein in use a picture is received in said space and positioned to be seen by looking at it through said transparent outer wall, and said abutments having opaque exposed upper edges that border the lid, the transparent outer wall of the lid, and the picture within the lid.

2. The picture frame storage box according to claim 1, further comprising a molding bordering the transparent outer wall of the lid, such that when the box is viewed from above, the molding borders the picture as seen through the transparent outer wall.

3. The picture frame storage box according to claim 1, wherein the compartment is sized to receive a plurality of video cassettes.

4. The picture frame storage box of claim 1, wherein the side edges and front and back edges of the lid are a vertical height substantially equal to the vertical extension of the abutment of each end wall above the top edges of the front and back walls, and wherein the width of the lid along its side edges is substantially the same as the width of the end walls, such that when the lid is placed over the storage compartment and resting atop the top edges of the front and back walls and abutted by the two inner surfaces of the end walls, the resulting picture frame storage box, as viewed from above, from the front, and from the back, appears to be in the shape of a rectangle.

5. A picture frame storage box comprising:

a box body having a front wall, a back wall, a pair of oppositely situated end walls that connect the front wall to the back wall, said front wall and said back wall each having a top edge, each said end wall is of a size and shape to extend above the top edges of the front and back walls creating abutments, each with an inner surface on its respective end wall situated above the top edges of the front and back walls, wherein each said inner surface faces the other, said box body also including a base that adjoins the front wall, the back wall and the two end walls;

at least one divider connecting the front wall to the back wall and laterally spaced between the two end walls, each said divider including a top portion that is of a size and shape to extend above the top edges of the front and back walls, creating an abutment having two oppositely situated inner surfaces, wherein an inner surface of the at least one divider abutment faces the inner surface of the nearest end wall and the opposite inner surface of the divider abutment faces either another inner surface of an abutment of an adjacent divider or the inner surface of the abutment of the opposite end wall wherein a plurality of storage compartments is defined above the base, and by and between the front wall, the back wall, the two end walls, and the at least one divider; and one lift off lid for each storage compartment, wherein each lid is of a size and shape to fit over its respective compartment by resting atop the front wall and back wall top edges and is abutted by two facing inner surfaces, whether of the adjacent end wall and the at least one divider, or between a pair of adjacent dividers, each said lid having an opaque inner wall, a transparent outer wall, two side edges, front and back edges, with a picture receiving space being formed by and between the inner and outer walls, wherein in use a picture is received in said space and positioned to be seen by looking at it through said transparent outer wall, and said abutments of the end walls and the at least one divider having opaque exposed upper edges that border the lid, the transparent outer wall of the lid, and the picture within the lid.

6. The picture frame storage box according to claim 5, further comprising a molding bordering the transparent outer wall of each lid, such that when the box is viewed from above, the molding borders the picture as seen through the transparent outer wall.

7. The picture frame storage box according to claim 5, further comprising at least one subdivider spanning between one end wall and its nearest divider, each subdivider forming a pair of subdivided storage compartments.

8. The picture frame storage box according to claim 5, wherein each compartment is sized to receive a plurality of compact discs.

9. The picture frame storage box according to claim 7, wherein each subdivided compartment is sized to receive a plurality of trading cards.

10. The picture frame storage box of claim 5, wherein the side edges and front and back edges of each lid are a vertical height substantially equal to the vertical extension of the abutment of each end wall above the top edges of the front and back walls and the vertical extension of the abutment of the top portion of the at least one divider that extends above the top edges of the front and back walls, and wherein the width of the lid along its side edges is substantially the same as the width of the end walls such that when each lid is placed over its respective storage compartment and resting atop the top edges of the front and back walls and abutted by its respective abutments, the resulting picture frame storage box, as viewed from above, from the front, and from the back, appears to be in the shape of a rectangle.

* * * * *

UNITED STATES PATENT AND TRADEMARK OFFICE
CERTIFICATE OF CORRECTION

PATENT NO: 5,692,613

DATED: December 2, 1997

INVENTOR(S): Stanford E. Opdyke

It is certified that error appears in the above-identified patent and that said Letters Patent is hereby corrected as shown below:

Claim 5, column 5, line 19, "whether of the adjacent end wall" should be -- either of the adjacent end walls --.

Signed and Sealed this

Twenty-fourth Day of March, 1998

Attest:

BRUCE LEHMAN

Attesting Officer — Commissioner of Patents and Trademarks